United States Patent [19]
Yoshikawa et al.

[11] 3,869,534
[45] Mar. 4, 1975

[54] METHOD FOR MANUFACTURING STRETCHED POLYVINYLIDENE FLUORIDE FILMS

[75] Inventors: Shinsuke Yoshikawa; Tohru Sasaki; Mitsuru Ota; Shuji Terasaki; Akira Funakoshi, all of Fukushima, Japan

[73] Assignee: Kureka Kagaku Kogyo K.K., Tokyo, Japan

[22] Filed: Apr. 6, 1973

[21] Appl. No.: 348,819

[30] Foreign Application Priority Data
Apr. 6, 1972    Japan................................ 47-34699

[52] U.S. Cl. ............................. 264/210 R, 264/289
[51] Int. Cl............................................... B29d 7/24
[58] Field of Search........ 264/210 R, 288, 289, 235, 264/346, DIG. 73

[56] References Cited
UNITED STATES PATENTS
2,952,878    9/1960    Swerlick et al. .................... 264/289
3,197,538    7/1965    Capron et al. ...................... 264/288
3,217,073    11/1965   Olson et al. ...................... 264/178 R
3,257,489    6/1966    Heffelfinger ...................... 264/289
3,691,264    9/1972    Asahima .............................. 264/22

Primary Examiner—Robert F. White
Assistant Examiner—James B. Lowe
Attorney, Agent, or Firm—Sughrue, Rothwell, Mion, Zinn & Macpeak

[57]    ABSTRACT

A method for manufacturing a stretched polyvinylidene fluoride film which comprises forming a non-stretched polyvinylidene fluoride film from a polyvinylidene fluoride polymer having an inherent viscosity in the range of from 0.8 to 1.8 as determined in a dimethylformamide solution at a concentration of 0.4 g/100cc at a temperature of 30°C, said non-stretched film containing spherulites having a diameter of from 2 to 20$\mu$, and stretching the resulting film at a temperature of from 140° to 165°C to a stretch magnification ranging from the spontaneous stretch magnification of said film to 1.8 times the spontaneous stretch magnification is disclosed.

7 Claims, No Drawings

METHOD FOR MANUFACTURING STRETCHED POLYVINYLIDENE FLUORIDE FILMS

BACKGROUND OF THE INVENTION

1. Field of the Invention

The present invention relates to a method for continuously and smoothly manufacturing a stretched polyvinylidene fluoride film having excellent mechanical and thermal properties.

2. Description of the Prior Art

It is well known that a stretched yarn or a uniaxially oriented film or tape can easily be produced by melt-extruding polyvinylidene fluoride and stretching the same in a longitudinal direction by a conventional method. However, when the film which has been oriented in one direction is to be further stretched to a right-angle direction perpendicular to the oriented direction, the thickness of the resulting film becomes extremely uneven, or otherwise the film is frequently broken during the stretching, and thus, it has hiitherto been very difficult to constantly produce a satisfactory biaxially oriented film.

That is, when a substantially non-oriented film of polyvinylidene fluoride is stretched in one direction at a temperature below the melting point of polyvinylidene fluoride but higher than the glass transition temperature thereof, a so-called constriction occurs linearly in a right-angled direction perpendicular to the stretched direction, and in addition, the thickness tends to be decreased within an extremely narrow space along the constriction line and the film is stretched. The polyvinylidene fluoride, different from any other crystalline resins does not have a tendency to disappear the above phenomena even after the stretching temperature is elevated almost nearly the melting point of polyvinylidene fluoride.

In such case, it is possible to constantly stretch the film only by adjusting the occurrence of the constriction line constantly in a certain position in the film, for example, by using a heater provided with a linear slit and locally heating the film between a pair of rollers whereby the constriction is forcedly caused in the film.

However, when the uniaxially oriented film thus obtained is to be stretched further in the right-angled direction perpendicular to the oriented direction by means of a conventional tenter, the above constriction occurs during the stretching. In this case, the uniaxially oriented film is fibrillated along the initially stretched direction, and thus the film is easily torn in the lengthwise direction, or otherwise if the film is stretched, uneven portions are caused in the entire surface of the film by the stretching. The term "fibrillation" used above means that the film tends to be easily torn due to the fibrous orientation of molecules but the film needs not necessarily to be torn in fibers. Due to the occurrence of uneven portions, the thickness of the resulting biaxially oriented film becomes uneven and the film becomes opaque. In addition, the strain in the film is remarkable. Thus, it has been difficult in the prior art technique to manufacture stretched films having commercially acceptable quality.

It is understood that the above difficulty in processability would be caused by the high crystallinity and the extremely high crystallization rate of the polyvinylidene fluoride resin and the high intermolecular cohesive force of the resin.

For the purpose of eliminating such phenomena, for example, British Pat. No. 936,398 suggests to previously incorporate a latent solvent in a polyvinylidene resin in an amount of from 5 to 80 percent based on the resin and to biaxially stretch the resulting resin.

In this method, however, since the resin to be stretched contains the solvent, it cannot be expected to form a high molecular orientation during the stretching.

In fact, as is shown in Examples of the above British patent, it is noted that the strength of the film obtained by this method is, at most, in the order of 12.5 kg/mm² (1,7500 psi). Moreover, this method involves various industrial problems such as recovery and removal of the solvent present in the film during and after the stretching.

SUMMARY OF THE INVENTION

As a result of extended studies on the problems associated in the stretching of polyvinylidene fluoride film prepared by melt-extrusion, it is found that a biaxially oriented polyvinylidene film having high mechanical strength and excellent thermal and dimensional stability can be manufactured constantly and smoothly, by improving the uniaxial stretching step.

That is, the present invention provides a method for manufacturing a stretched film by stretching a film-shaped material of polyvinylidene fluoride resin, which is spherulites having a diameter of from 2 to 20$\mu$, to one direction at a temperature of from 140° to 165°C under a specifically determined stretching magnification.

The present invention further provides a method for manufacturing a stretched polyvinylidene fluoride film by further stretching the film stretched as above by 4.0 to 8.0 times the above stretched film in a direction cross to the first stretching direction at a temperature of from 150° to 175°C and then, if necessary, thermally fixing the thus stretched film.

DETAILED DESCRIPTION OF THE INVENTION

The polyvinylidene fluoride resins to be used in the present invention include, for example, a polymer of vinylidene fluoride $CH_2=CF_2$ and a copolymer of the vinylidene fluoride and other copolymerizable ethylene, haloethylene such as tetrafluoroethylene, monochloro-trifluoroethylene, hexafluoropropylene, vinyl fluoride, etc., in the latter copolymer, the content of the copolymerizable monomer component being at most 5 mol percent. The molecular weight of the polymer is an important factor to determine the shaping and processing character of the resin and the physical properties of shaped product, and in the present invention, it is preferable to adjust the intrinsic viscosity of the polyvinylidene fluoride to the range of 0.8 – 1.5.

The inherent viscosity of the polyvinylidene fluoride resin is calculated by the following equation:

$$\eta_{inh} = [\ln \eta_\gamma ]/C$$

In the above equation $\eta_\gamma$ stands for a relative viscosity and is measured at 30°C in dimethylformamide solution at a polyvinylidene fluoride concentration of 0.4 g/100cc. The relative viscosity $\eta_\gamma$ means a viscosity ratio between the polymer solution and dimethylformamide as a solvent, and [$\ln \eta_\gamma$] represents a natural logarithm corresponding thereto. C denotes a weight of the polymer in 100cc of dimethylformamide.

In general, it has been a common knowledge in the conventional technical art in this field that when a shaped product of crystalline resin is to be stretched, the nonstretched film to be used must be prepared at most 80°C or, as the case may be, by rapidly cooling at below 15°C. (For example, refer to U.S. Pat. No. 3,217,073) This is due to the fact that if the nonstretched film is gradually cooled, the crystallinity of the film increases thereby resulting in the formation of large spherulites in the film and, when such spherulites are formed, the stretching of the film in a subsequent stretching step becomes difficult or uniform stretching cannot be effected.

According to the investigation by the present inventors, it has been found that when a film-shaped material obtained by the melt-extrusion of a polyvinylidene fluoride resin is cooled and solidified by lowering the temperature of the film-shaped material to cool the film substantially rapidly in order to avoide the formation of any large spherulites, a strain occurs in the resulting film due to the crystallization and the strain seriously affects the subsequent stretching in the longitudinal and cross directions. That is, the polyvinylidene fluoride is a crystalline resin having a 40–50 percent crystallinity and if the temperature is lowered below 150°C during the resin is crystallized from the molten state thereof, the crystallization rate rapidly increases, and in particular, when the resin is cooled at a temperature below 80°C, a volume contraction rapidly occurs due to the crystallization thereof to cause the formation of a local stress and strain in the resulting film. Although the surface of the thus prepared film appears to be smooth, the film sometimes tends to be fibrillated by longitudinal stretching and any uniform molecular orientation cannot be attained. Accordingly, when the film is stretched to the cross direction, the film is torn and broken in the longitudinal direction, or otherwise, unevenly stretched portions are formed in the entire surface of the film whereby the thickness of the film becomes still more uneven and the smooth surface cannot be obtained in the resulting film.

It has been found that when a uniaxially oriented film is manufactured by melt-extruding polyvinylidene fluoride having a $\eta_{inh}$ of 0.8–1.8 and cooling and solidifying the same at a temperature of at least 80° to below 150°C (preferably 100°–145°C), the diameter of the spherulites formed in the film-shaped material being adjusted to 2 to 20$\mu$, and then stretching the resulting film-shaped material in a longitudinal direction at a temperature of 130° to 170°C, preferably 140 to 165°C, by up to 1.8 times of the spontaneous stretch magnification of the material and the thus obtained film is then stretched in the cross direction, any fibrillation does not occur, and it is possible to manufacture smoothly a biaxially oriented polyvinylidene fluoride film having uniform structure by stretching the uniaxially oriented film by 4.0–8.0 times to the cross direction at a temperature of 150° to 175°C. The "spontaneous stretch magnification" means the minimum stretch magnification required for completely eliminating the constriction produced in the stretched film during the stretching. The spontaneous magnification varies depending upon the stretching conditions (in particular, temperature), the thickness of the film (this mainly results from the difference of the orientation of the non-stretched film due to the difference of the grafted degree thereof), and the type of raw resins etc., and when a given film are stretched under given conditions the spontaneous stretch magnification is kept constant and is about 2 to 4 times. The polyvinylidene fluoride resin which can be used in the present invention includes those prepared by, for example, a mass polymerization disclosed in U.S. Pat. No. 2,435,537 an emulsion polymerization disclosed in U.S. Pat. No. 3,193,537 a suspension polymerization disclosed in British Pat. Nos. 1,079,108 and 1,094,558 as well as other conventional procedures, and has a $\eta_{inh}$ of 0.8 to 1.8, preferably $\eta_{inh}$ of 0.9 to 1.5. If the viscosity $\eta_{inh}$ is lower than 0.8, the extrusion of the resin may easily be performed due to its low viscosity, but the crystallization tends to occur during the cooling and as a result, when the film is stretched to the longitudinal direction, fibrillation remarkably occurs in the longitudinally stretched film and the film is therefore easily torn.

If the viscosity $\eta_{inh}$ exceeds over 1.8, the extrusion of the resin becomes difficult and, further, the strain in the film formed by the stretching tends to be increased whereby the film is easily cut during the stretching in the cross direction.

Thus, in the present invention it is necessary to use such polyvinylidene fluoride resin having a specifically defined inherent viscosity $\eta_{inh}$ of 0.8–1.8. In the present invention, after the polyvinylidene fluoride resin having the specific inherent viscosity is melt-extruded, the thus extruded resin is cooled on a roll heated at a temperature of form 80° to 150°C, preferably 100° to 140°C, to make a nonstretched film. It has been confirmed by the electron microscopic observation that in the nonstretched film thus obtained under such cooling condition, spherulites having a diameter of 2–20$\mu$ are formed. The size of the spherulites in the film depends upon the melt-extrusion temperature, the thickness of the film and the cooling rate. But among those factors, the cooling rate, especially the cooling temperature is significant. As a result of extended studies on the relationship between the size of spherulites and the various factors, it was found that a biaxially oriented film cannot always be obtained if the size (diameter) of the spherulites is outside the range of 2–20$\mu$.

That is, when a non-stretched film prepared by melt-extrusion followed by cooling and solidification where the size of the spherulites is smaller than 2$\mu$ (diameter) is subsequently uniaxially stretched in the longitudinal direction at a temperature of from 130° to 170°C, preferably 140° to 165°C, in the stretch magnification range of more than the spontaneous stretch magnification up to 1.8 times of the spontaneous stretch magnification, and thereafter is biaxially stretched in the cross direction by means of a tenter at a temperature of from 150° to 175°C by 4.0–8.0 times magnifications, a fibrillation often occurs in the stretching direction during the uniaxial stretching in the former step, and due to the occurresnce of the fibrillation, the film is in many cases broken during the cross stretching by the tenter in the latter step. In addition, the film which has been biaxially stretched without having been broken involves unevenly stretched portions caused by the inner strain due to the fine, unevenly cooled portions and by the difference in the intermolecular conesive force due to the fibrillation during the uniaxial stretching between the crystalline portions and non-crystalline portions.

The unevenly stretched portions of the film are explained as comprising uniformly and transparently stretched fine portions and insufficiently and semi-transparently stretched fine portions which appears to be spherulite residues, and the above uneven portions ultimately increase the uneven thickness of the film thereby resulting in the formation of opaque film which lacks the smoothness.

In addition, when such film is heated, fine wrinkles are formed on the surface of the film due to the difference in the thermal schrinkage between the transparent portions and the opaque portions, and in particular, when the film is used at higher temperatures, the above film is not durable to the use at such higher temperatures as being poor in the thermal and dimensional stability.

In particular, the polyvinylidene fluoride film generally has a high dielectric constant and excellent electrical properties. When the film is used as a dielectric material for capacitors the above properties would make it possible to reduce the size of conventional capacitors using organic films to less than 1/3. Further, one of the important utilities of the polyvinylidene fluoride film is a metallized capacitor composed of a roll of a pair of the metallized polyvinylidene fluoride film where a metal such as aluminum, zinc, tin and the like is plated on one surface of the film by vacuum evaporation plating. In this process, the metal is continuously plated by vacuum evaporation at a temperature ranging from 100° to 150°C and a pair of the metallized film is rolled.

Since the film prepared by the conventional process usually possesses fine distortions on the surface and is also not uniform in its structure, it sometimes form spots caused by uneven stretching or shrinking due to the heating and further it is wrinkled in rolling operations thereby making it impossible to porduce a metallized film of a commercial grade. In order to eliminate the above disadvantages encountered in the conventional process, the present inventors conducted experiments on post-stretching of films, which have been biaxially stretched, at various stretching ratios up to 2 times the original film. These experiments are based on the consideration that the wrinkles in rolling operations may be avoided if constriction distortion is provided in the film and the resulting film is shrinked and strained by heat during the vacuum evaporation plating, and various experiments and investigations were conducted on the above described post-stretched film during the vacuum evaporation plating. The resulting post-stretched film showed some improvements in eliminating wrinkles in rolling operations, while the film prepared in accordance with the present invention was found to have no wrinkles in rolling operations without post-stretching thereby making it possible to conduct effectively the vacuum evaporation plating.

In case where a stretched film containing spherulites having a diameter exceeding $20\mu$ is further stretched under the same stretching conditions as described above, it has been found that the film appears to be uniformly stretched, but the transparency of the entire film is extremely poor and the mechanical strength of the resulting film is very low.

The most important factor in the stretching technique by using tenter is a stretch deformation rate (percent/min) to be determined by the initial angle of the tenter, the flowing speed of the film and the stretch magnification; and when a nonstretched film containing spherulites having a diameter smaller than $2\mu$ or greater than $20\mu$ is stretched under the stretch deformation rate in the range of from 500 to 5,000 percent/min which is considered to be industrially adaptable in view of the stretching operation and the apparatus equipment, the above described defects could not be solved.

The reason for the necessity of the uniaxial stretch magnification in the longitudinal direction to limit below 1.8 times the spontaneous stretch magnification is that, in the uniaxially stretched film which has been stretched above the above-described magnification, the degree of the molecular orientation in the longitudinal direction becomes extremely high, and the fibrillation in the film is thereby strengthened and the film tends to be broken along the fibrillated direction. Therefore, even if the diameter of spherulites, the stretching temperature and the stretch deformation rate are limited, the film is still easily broken during the biaxial stretching by the tenter, and thus smooth stretching of the film becomes difficult.

The spontaneous stretch magnification varies depending upon the stretching temperature and the thickness of the non-stretched film and, in general, falls within the range of 2.0 to 3.8 times at a thickness of 0.03–1.00 mm and at a stretching temperature of 140° to 165°C.

The film which has been stretched in the above described uniaxial stretch magnification can successively be stretched in the cross direction by 4.0–8.0 times, using a conventional tenter at a temperature ranging from 150° to 175°C and then, if necessary, thermally fixed.

The thermal fixing referred to above means a thermal treatment for tension or relaxation up to ±10 percent in both longitudinal and lateral directions at a temperature in the range of from 125° to 175°C. Preferably, the thermal treatment is conducted at a temperature in the range of from 145° to 165°C to a relaxation of from −2 percent to −6 percent in both longitudinal and lateral directions.

The present invention will be illustrated in greater detail by the following examples but they are not to be construed as limiting the scope of this invention.

EXAMPLE 1

A Polyvinylidene fluoride resin having an inherent viscosity of 1.15 was melt-extruded a temperature of 270°C to form a film, and the film thus obtained was then cooled and solidified on a roll heated at 120°C under a rate of 3.0 m/min to obtain a non-stretched film having a thickness of 0.30 mm (non-stretched film). The spontaneous stretch magnification of the film was found to be 2.6 times at 155°C and the film was stretched at 155°C in the longitudinal direction by 2.8 times and successively stretched at 170°C in the cross direction by 5.5 times thereafter, the stretched film was thermally fixed at a temperature of 175°C to obtain a biaxially stretches film having a thickness of $20\mu$, and having the properties shown in Table 2 below.

Separately, a non-stretched film having the same size and almost the same spontaneous stretch magnification upon cooling at 70°C after melt-extrusion as above was prepared as a control in the same manner as above. the non-stretched film thus obtained was then biaxially stretched under the same stretching conditions as above to form a biaxially stretched film.

The properties of the non-stretched films of the present invention and the control film are shown in Table 1, and the properties of the biaxially stretched films are shown in Table 2 below.

Table 1

| Properties of Non-Stretched Film | Present Invention | Control |
|---|---|---|
| Specific Gravity (30°C) | 1.778 | 1.771 |
| Diameter of Spherulite ($\mu$) | 3 – 8 | less than 1 |

The diameter of the spherulites was determined by measuring the size from the surface reprica using an electron microscope and from the observation using a polarizing microscope.

The distribution of the diameter of the spherulites in the non-stretched film was found to be almost uniform in the direction of thickness.

The properties of the biaxially stretched films including the control film are shown in Table 2 below.

Table 2

| Properties of Biaxially Stretched Film | Present Invention | Control |
|---|---|---|
| Thickness ($\mu$) | 20.2 | 20.0 |
| Uneven Thickness in Longitudinal Direction R (%) | 3.2 | 9.6 |
| Uneven Thickness in Cross Direction R (%) | 6.8 | 16.0 |
| Tensile Strength in Longitudinal Direction (kg/mm$^2$) | 16.0 | 16.5 |
| Tensile Strength in Cross Direction (kg/mm$^2$) | 22.1 | 20.5 |
| Tensile Elongation in Longitudinal Direction (%) | 182.0 | 135.0 |
| Tensile Elongation in Cross Direction (%) | 90.0 | 34.0 |
| Transparency, Haze (%) | 2.0 | 9.8 |
| Thermal Shrinkage in Longitudinal Direction (%) (after heated for 10 minutes at 140°C) | 1.2 | 2.8 |
| Occurrence of Fine Wrinkles | | |
| (after heated for 1 hour at 130°C) | none | occurred |
| (after heated for 1 hour at 150°C) | none | occurred |
| Number of Cutting During Stretching by Tenter (per hour) | less than 0.05 | more than 2.0 |

As is apparent from the above Table 2, the biaxially stretched film obtained according to the present invention is superior to the control film which was prepared from the non-stretched film obtained by rapid cooling after extrusion, in that the thickness of the resulting film of the former is more uniform with less uneven portions, and the thermal stability of the former film is excellent. Thus, the film of the present invention can be produced on an industrial scale. On the contrary, the control film shows that transparent portions and opaque portions which are considered as crystalline residues are present together, and the variation of the thickness in a quite narrow space is remarkable. As will be understood from the fact the uneven thickness in the longitudinal direction which was measured by means of micrometer method also is remarkable in the control film, it is obvious that the uneven stretching actually occurred in the control film. Further, it can easily be understood that the uneven stretching also increases the occurrence of breaking of the film during the stretching by the tenter so that the control film appears to be suitable for the production on an industrial production.

The occurrence of the fine wrinkles are determined by allowing film to stand under a dry heat at 150°C for 1 hour to shrink the film and observing the surface of the film by the naked eye.

In the control film, the fine wrinkles were formed on the entire surface of the film and the film is deformed, but, on the contrary, the film of the present invention was quite free from such wrinkles and the surface was found to be smooth. These fine wrinkles are considered to be produced from presence of the above crystalline residues and the uneven orientation, and in the control film even after the film was fully thermally fixed, these wrinkles could not be prevented.

The film which is capable of producing such wrinkles is not desirable for practical use, since the film may form wrinkles when the film is used as a laminated film and the adhesive used for the lamination is dried under heat, or when the film is heated during secondary processings such as evaporation coating etc. Thus, the formation of the wrinkles will be a serious problem in producing films of high quality.

EXAMPLE 2

A polyvinylidene fluoride resin having an inherent viscosity of 1.10 was melt-extruded at a temperature of 260°C to form a film, and the resulting film was then cooled and solidified on a roll heated at 130°C and revolved at a rate of 7 m/min, to shape a non-stretched film having a thickness of 0.14 mm. The film thus obtained was then stretched at 150°C in the longitudinal direction by 2.6 times to obtain a uniaxially stretched film (Sample - 1).

Separately, a uniaxially stretched film was prepared in the same manner as above but using a temperature of 75°C for cooling and solidification after the melt-extrusion to prepare a control film (Sample - 2).

The properties of the above obtained two non-stretched films are show in Table 3 below.

Table 3

| Properties of Non-Stretched Film | Present Invention | Control |
| --- | --- | --- |
| Specific Gravity (30°C) | 1.775 | 1.765 |
| Diameter of Spherulite (μ) | 2 – 5 | less than 1 |
| Spontaneous Stretch Magnification (150°C) | 2.4 times | 2.4 times |

The uniaxially stretched films of Sample 1 and Sample 2 were uniformly heated and stretched in the cross direction under various stretching conditions to obtain films each having a thickness of about 9μ. The typical properties of the resulting films are shown in Table 4 below. In the Table 4, the opening angle of the tenter shows the angle between a pair of guide rails facing each other, when a pair of clips grasping the both ends of the film are guided along the groove of the rail to linearly extend whereby the grasped film is stretched in the cross direction. The stretching temperature referred to in the Table means a hot air temperature measured at 10 mm above the stretching film.

Table 4

| Uniaxial Film Sample No. | Tenter Opening Angle (degree) | Film Running Speed (m/min) | Stretching Temperature (°C) | Stretch Magnification | Fine Wrinkles Formed After 1 Hour Heating | Uneven Thickness in Longitudinal Direction (%) | Braking During Stretching (per hour) |
| --- | --- | --- | --- | --- | --- | --- | --- |
| 1 | 10 | 20 | 169 | 5.8 | non at 150°C | 3.6 | less than 0.1 |
| 1 | 14 | 16 | 169 | 5.9 | do. | 3.6 | do. |
| 1 | 18 | 16 | 174 | 6.2 | do. | 3.2 | 0.1–0.5 |
| 2 | 8 | 20 | 170 | 5.8 | occurred at 120°C | 11.2 | more than 2 |
| 2 | 10 | 16 | 170 | 5.8 | do. | 11.2 | do. |
| 2 | 10 | 10 | 174 | 6.0 | occurred at 130°C | 9.6 | 1–2 |
| 2 | 14 | 16 | 175 | 6.0 | occurred at 120°C | 8.9 | more than 3 |
| 2 | 18 | 8 | 175 | 6.2 | do. | 8.9 | 2–3 |

As is apparent from the above Table 4, the stretching processability of the non-stretched film of the present invention containing spherulites having a diameter higher than 2μ is remarkably excellent. It is understood that the above excellent processability would be produced for the reason that the polyvinylidene fluoride resin is different from other crystalline resins such as polypropylene, polyester, nylon, etc. and the yield stress remains nearly up to the temperature in the vicinity of the melting point thereof, as described previously. the polyvinylidene fluoride resin film can therefore be stretched even by a uniform hot air heat stretching using a tenter while the constriction line is fixed.

That is, the crystals formed by the present method may easily be broken during the stretching and thus the film can be uniformly stretched. On the contrary, however, the control film containing spherulites having a small diameter retains the internal strain occurred during the cooling and thus the fibrillation is increased, and further the stretched stress is different between the crystalline portions and the non-crystalline portions. For this reason, the constriction line is unstable during the treatment by tenter, and thus uneven thickness occurs in the resulting stretched film and fine wrinkles are formed after the heat treatment of the film. For the purpose of stabilizing and fixing the constriction line, it is considered efficient to make the opening angle of the tenter larger and to make the film running speed higher and further to lower the stretching temperature. It has been confirmed however, that such means result in the increase of the breaking of the film and are therefore quite unacceptable from the practical viewpoint. It is an unexpected and surprising fact that the elevation of the stretching temperature results in the decrease of the mechanical properties of the film, and even if such defect is disregarded, the uniformity of the film and the stretching processability thereof are not improved in the control film.

As is explained above, in detail the technical idea of the method of the present invention is fundamentally different from the conventional technique conception on the stretching of crystalline resins where the non-stretched film is cooled as rapidly as possible to form spherulites having a small diameter in the film. Thus, in the present invention, the stretching processability of polyvinylidene fluoride resin and the quality of the stretched film are remarkably improved.

While the invention has been described in detail and with reference to specific embodiments thereof, it will be apparent to one skilled in the art that various changes and modifications can be made therein without departing from the spirit and scope thereof.

What we claim is:

1. A method for manufacturing a stretched polyvinylidene fluoride film which comprises forming a non-stretched polyvinylidene fluoride film from melt-extruding a polyvinylidene fluoride polymer having an inherent viscosity in the range of from 0.8 to 1.8 as determined in a dimethylformamide solution at a concentration of 0.4g/100cc at a temperature of 30°C, cooling and solidifying the extruded film at a temperature of from 80° to 150°C to form a non-stretched film containing spherulites having a diameter of from 2 to 20 μ, and stretching the resulting film at a temperature of from 140° to 165°C to a stretch magnification ranging from the spontaneous stretch magnification of said film to 1.8 times the spontaneous stretch magnification.

2. A method for manufacturing a biaxially oriented polyvinylidene fluoride film which comprises forming a non-stretched polyvinylidene fluoride film from melt-extruding a polyvinylidene fluoride polymer having an inherent viscosity in the range of from 0.8 to 1.8 as determined in a dimethylformamide solution at a concentration of 0.4 g/100 cc at a temperature of 30°C, cooling and solidifying the extruded film at a temperature of from 80° to 150°C to form a non-stretched film containing spherulites having a diameter of from 2 to 20 $\mu$, stretching the resulting film in the longitudinal direction at a temperature of from 140° to 165°C to a stretch magnification ranging from the spontaneous stretch magnification of said film to 1.8 times said spontaneous stretch magnification, and subsequently stretching the resulting uniaxially stretched film in the cross direction at a temperature of from 150° to 175°C by 4.0–8.0 times followed by thermally fixing the biaxially stretched film.

3. The method of claim 1 wherein the polyvinylidene fluoride polymer used is selected from the group consisting of a polymer of vinylidene fluoride $CH_2=CF_2$, a copolymer of the vinylidene fluoride and a monomer copolymerizable with the vinylidene fluoride, the maximum content of said monomer in the copolymer being 5 mol percent.

4. The method according to claim 2 wherein the polyvinylidene fluoride polymer used is selected from the group consisting of a polymer of vinylidene fluoride $CH_2=CF_2$, a copolymer of the vinylidene fluoride and a monomer copolymerizable with the vinylidene fluoride, the maximum content of said monomer in the copolymer being 5 mol%.

5. The method according to claim 3 wherein said monomer is selected from the group consisting of ethylene, tetrafluoroethylene, monochlorotrifluoroethylene, hexafluoropropylene and vinyl fluoride.

6. The method according to claim 4 wherein said monomer is selected from the group consisting of ethylene, tetrafluoroethylene, monochlorotrifluoroethylene, hexafluoropropylene and vinyl fluoride.

7. The method according to claim 1 wherein the spontaneous stretch magnification is 2.0 to 3.8 times.

* * * * *